(12) United States Patent
Donnell

(10) Patent No.: US 7,921,669 B2
(45) Date of Patent: Apr. 12, 2011

(54) PORTABLE REFRIGERATION DELIVERY SYSTEM

(76) Inventor: Greg Donnell, Franklin, NY (US)

(*) Notice: Subject to any disclaimer, the term of this patent is extended or adjusted under 35 U.S.C. 154(b) by 1457 days.

(21) Appl. No.: 11/104,710

(22) Filed: Apr. 13, 2005

(65) Prior Publication Data

US 2005/0229625 A1 Oct. 20, 2005

Related U.S. Application Data

(60) Provisional application No. 60/562,146, filed on Apr. 14, 2004.

(51) Int. Cl.
*F25D 3/08* (2006.01)
(52) U.S. Cl. .................................. 62/457.2; 62/530
(58) Field of Classification Search ............ 62/457.1–9, 62/440, 530, 387, 457.2; 220/592.17, 707, 220/708, 592.01; 206/822; 248/678, 346.01, 248/346.03
See application file for complete search history.

(56) References Cited

U.S. PATENT DOCUMENTS

| | | | |
|---|---|---|---|
| 5,201,654 A * | 4/1993 | Kuehn et al. | 433/25 |
| 5,439,125 A * | 8/1995 | Bloch | 215/229 |
| 5,598,943 A * | 2/1997 | Markus | 220/592.03 |
| 5,759,275 A * | 6/1998 | Shostak | 118/504 |
| D446,420 S | 8/2001 | Donnell | |
| 6,364,329 B1 * | 4/2002 | Holub et al. | 280/47.26 |
| 6,751,981 B1 * | 6/2004 | Burnette | 62/457.2 |
| 2005/0019531 A1 * | 1/2005 | Bazbaz | 428/156 |
| 2007/0193298 A1 * | 8/2007 | Derifield | 62/372 |

* cited by examiner

*Primary Examiner* — Mohammad Ali
(74) *Attorney, Agent, or Firm* — Howard M. Cohn

(57) ABSTRACT

A refrigeration delivery system for use with portable food storage systems having an L-shaped body with a hollow vertical tower portion and a hollow horizontal flat lower portion. The internal volume of the body is suitable for the storage of ice and a combination of ice and melt water. In one embodiment, a hand-powered pump and spout is provide through a top of the tower portion to pump chilled water for drinking or to remove it from the delivery system. A second embodiment incorporates a flexible straw arrangement through a top of the tower portion. A third embodiment incorporates both a hand-powered pump and spout as well as a flexible straw arrangement through a top of the tower portion.

16 Claims, 3 Drawing Sheets

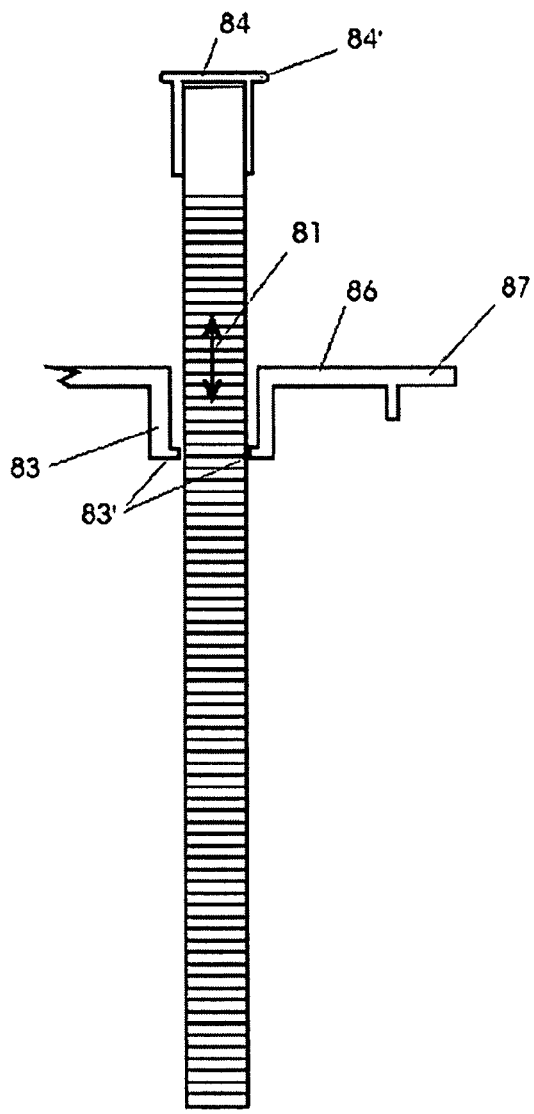
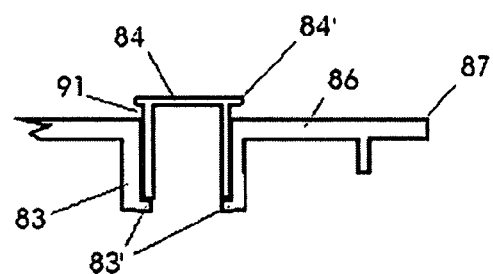
Fig. 6
Fig. 5

PORTABLE REFRIGERATION DELIVERY SYSTEM

CROSS-REFERENCE TO RELATED APPLICATIONS

This application claims the benefit of U.S. Provisional Patent Application No. 60/562,146 filed on Apr. 14, 2004 which is incorporated herein by reference.

FIELD OF THE INVENTION

This invention relates generally to refrigeration and, more specifically, to a non-mechanical, ice-holding system designed for use in conjunction with portable systems for carrying food and drinks in cars and on vacations and picnics.

BACKGROUND

Food and drinks are commonly carried on long trips in cars and to vacation places or simply on picnics. Comestibles usually need to be maintained at reduced temperatures for the sake of preservation and taste.

Ice-chilled or other types of portable refrigerated food carrying systems widely used these days include varieties of thermally-insulated cold storage, or "ice" chests of a sort that are available in a variety of sizes, styles, and complexity. Some are so large as to require wheels to enhance their "portability." These food carrying systems are commonly used with water ice or, less commonly, with "dry" ice, (i.e., solid carbon dioxide), and occasionally with mechanical, absorption, or thermoelectric refrigeration capacity built in. The electrically powered refrigerated systems that are now available are primarily of the thermoelectric type which, though initially offered as panaceas, are far from generally capable, almost pitifully incapable of achieving the desired cooling effectiveness, and they can be unreliable. Thermoelectric systems also require electrical power connections which add to the overall weight, complexity and use requirements. In general, the refrigeration capacity of thermoelectric systems, especially when warm foods or drinks are placed within the refrigeration system, is poor.

The typical portable non-electric food-carrying and storage systems consist of an insulated box that often includes a movable shelf that is sometimes used to hold ice or frozen packages of salt solutions intended to impart refrigeration to, or absorb heat from, the materials being chilled. Some people use frozen milk cartons full of water as storage for refrigeration, while many people use simple plastic bags of ice to provide refrigeration. However, distribution of the refrigeration is often uneven. There is also the problem of meltwater, which can accumulate a the bottom of a food container, thereby rendering baked goods and other foods soggy and unpleasant.

ASPECTS OF THE INVENTION

In view of the foregoing, one aspect of the present portable food and drink refrigeration system is to provide uniform chilling for food and drinks contained within a portable food storage container.

Another aspect of the present refrigeration system is to provide uniform cooling to food and drink contained within a food storage container.

Another aspect of the present invention is to keep melt water from ice from rendering stored foods soggy and unpleasant.

Another aspect of the present refrigeration system invention is to provide clean, cool drinking water.

Another aspect of the present invention is to provide a portable refrigeration system that does not depend upon a continuous supply of electric power.

Another aspect of the present invention is to provide for delivery of refrigeration to all the contents of a food storage container, as well as to the air within the container.

Yet another aspect of the present invention is to provide a way to manage the gradual melting of the ice which provides refrigeration, and deliver the resulting refrigeration where it is needed over periods of tens of hours.

And a final aspect of the present refrigeration invention is to provide a way to control the melt rate of the ice in such a way as to correspond with the cooling load that is needed.

SUMMARY OF THE INVENTION

One embodiment of the present invention is directed to an improved portable refrigeration delivery system, comprising: a main body formed of a hollow vertical tower portion and a hollow lower horizontal flat portion; an access portal having a snap-on lid disposed through the top of the vertical tower portion; and a hand actuated pump disposed through the top of the vertical tower portion comprising, a plunger portion extending into the vertical tower portion, and a spout portion. The lower horizontal flat portion includes an array of protrusions integral therewith and extending upward therefrom. The spout portion can be is sufficiently long to protrude beyond the back edge of the top of the vertical tower portion. The spout portion can be swivelled. The hand actuated pump can be collectively rotatable in relation to the hollow vertical tower portion of the main body. The snap-on lid of the access portal can be hinged to the main body.

Another embodiment of the present invention is directed to an improved portable refrigeration delivery system, comprising: a main body formed of a hollow vertical tower portion and a hollow lower horizontal flat portion; an access portal having a snap-on lid with a lift tab disposed in the top of the vertical tower portion; and a receptacle disposed within the snap-on lid to accommodate a straw. The lower horizontal flat portion includes an array of protrusions integral therewith and extending upward therefrom. The straw is removable from the receptacle within the snap-on lid and can be flexible. The straw can have a cap. The cap of the straw can fit within and seal the receptacle within the snap-on lid when the straw is removed therefrom. The receptacle within the snap-on lid has a stop that limits the insertion of the cap within the receptacle. The portable refrigeration delivery system has a size suitable for use within an ice chest or within a standard lunch box type food container.

Still another embodiment of the present invention is directed to an improved portable refrigeration delivery system, comprising: a main body formed of a hollow vertical tower portion and a hollow lower horizontal flat portion; an access portal having a snap-on lid with a lift tab disposed upon the top of the vertical tower portion; a hand actuated pump comprising, a plunger portion extending through the top of the vertical tower portion, and a spout portion; and a receptacle disposed within the snap-on lid to accommodate a straw. The spout portion is sufficiently long to protrude beyond a back edge of the top of the vertical tower portion. The straw is flexible and removable. The straw can have a cap that fits within and seals the receptacle within the snap-on lid when the straw is removed therefrom.

BRIEF DESCRIPTION OF THE DRAWINGS

The structure, operation, and advantages of the present invention will become further apparent upon consideration of the following description taken in conjunction with the accompanying figures (FIGURES). The figures are intended to be illustrative, not limiting.

Certain elements in some of the figures may be omitted, or illustrated not-to-scale, for illustrative clarity. The cross-sectional views may be in the form of "slices", or "near-sighted" cross-sectional views, omitting certain background lines which would otherwise be visible in a "true" cross-sectional view, for illustrative clarity.

Figure 1:
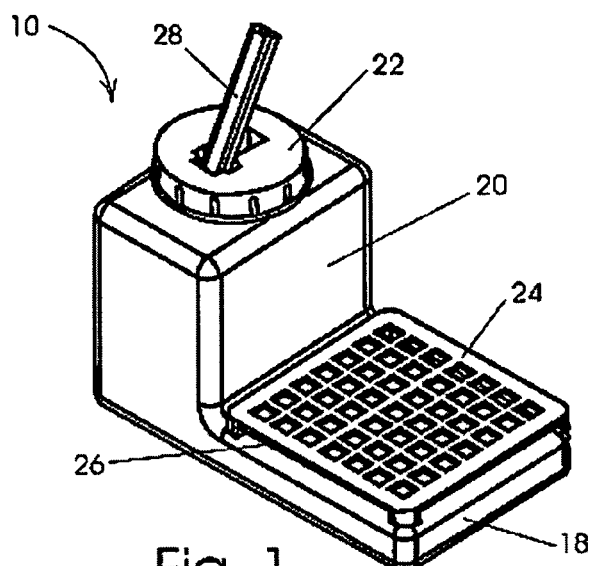

In the drawings accompanying the description that follows, often both reference numerals and legends (labels, text descriptions) may be used to identify elements. If legends are provided, they are intended merely as an aid to the reader, and should not in any way be interpreted as limiting.

Often, similar elements may be referred to by similar numbers in various figures of the drawing, in which case typically the last two significant digits may be the same, the most significant digit being the number of the drawing figure.

Figure 2:
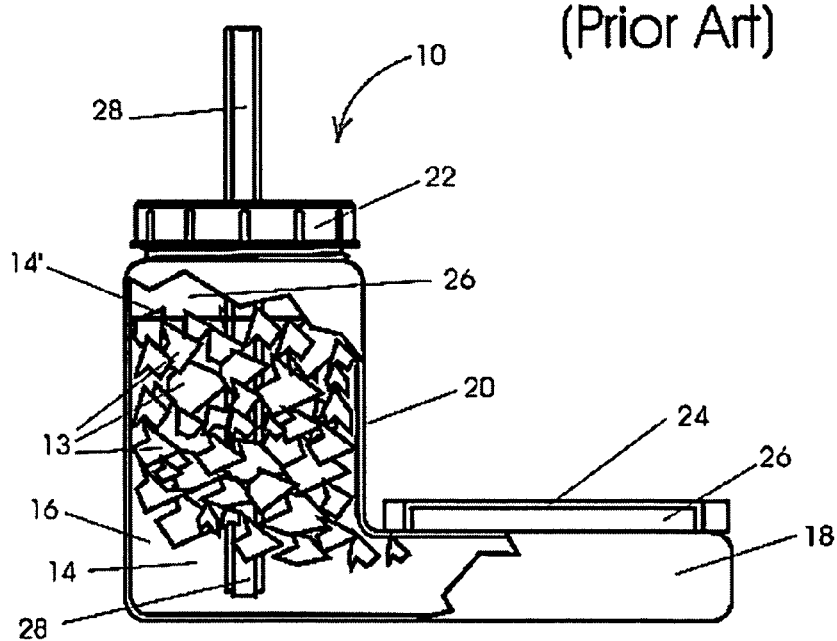
Figure 3:
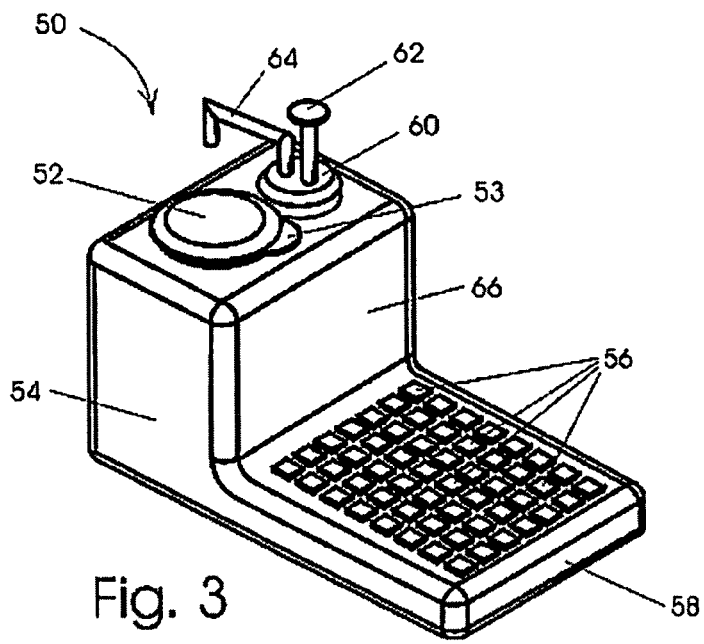
Figure 4:
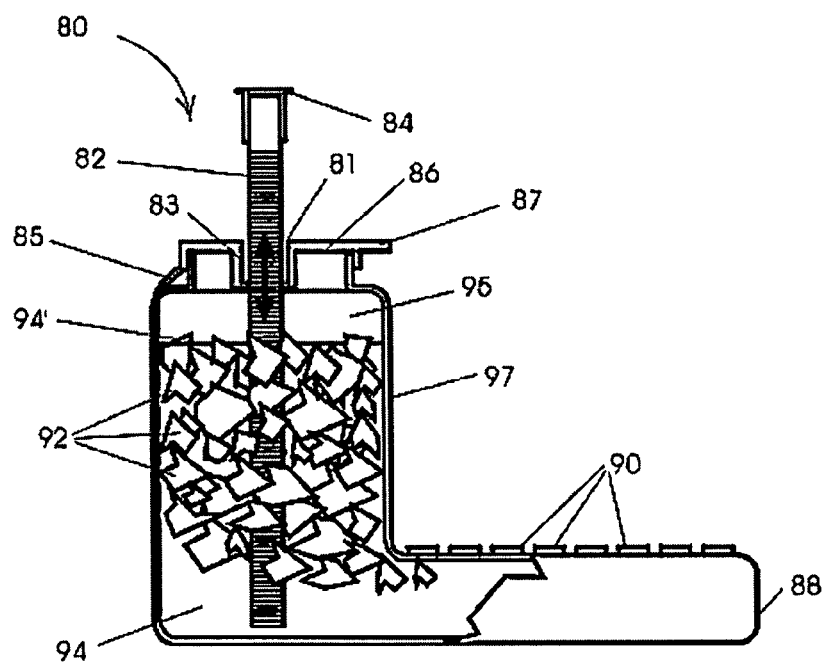

These and other features of the present invention will be apparent with reference to the following description and drawings wherein:

FIG. 1 is an oblique view of a prior art portable refrigeration delivery system;

FIG. 2 is an partial cut-away orthogonal side view of the same prior art invention;

FIG. 3 is an oblique view of one embodiment of the present invention;

FIG. 4 is a partial cut-away orthogonal side view of an embodiment of the present invention;

FIG. 5 is a orthogonal cross sectional views of the straw lid, and straw cap according to the present invention; and FIG. 6 is a partial cut-away side view of the straw cap inserted into the lid according to the present invention.

DETAILED DESCRIPTION OF PREFERRED EMBODIMENTS

The present invention is for improving upon ways to provide a refrigeration system suitable for use in conjunction with portable, thermally insulated, food-and-drink carrying systems. To this end, there is disclosed an ice-and-water-carrying insert invention designed for use within an insulated container of the sort typically used to carry food and drinks while driving long distances or on vacations to such locations as camp grounds where electric power is often not available.

The present invention can deliver refrigeration to all the contents of a food carrying chest as well as to the air inside the chest. The invention also permits containment and/or withdrawal of melt water, while the invention is used to distribute uniform refrigeration within the aforesaid insulated container.

The invention derives its refrigerating capacity from the latent heat of fusion of water ice as the ice melts. It also makes use of the a well-known but not widely-practiced principle of convective heat transfer from a chilling source that maintains at a constant temperature corresponding to the freezing point of water. Specifically, a mixture of water and ice in a container maintain in thermal stability at a constant temperature of 0° C. (32° F.), or close thereto depending upon the presence of such compounds as salt or antifreeze-type compounds within a solution of water that is at least partially frozen.

Referring to FIG. 1, there is shown in oblique view the aforementioned prior art portable refrigeration delivery invention 10. FIG. 2 shows the prior art refrigeration system 10 in orthogonal side view, with partial cutaway to show a combination of ice chips 12 in water 14, the latter filling the internal space 16 of the invention to a level indicated by 14'. The internal volume of the refrigeration system is about 4 liters, or 1 gallon. This prior art portable refrigeration delivery system 10 shown in FIGS. 1 and 2 has a shape and dimensions that allow it to be placed inside a typical insulated picnic type ice chest of the sort generally used for carrying drinks and comestibles for use in car journeys and on picnics, beach trips, and the like. The lower horizontal portion 18 contains an enclosed volume which is internally contiguous with the contained volume of the vertical tower portion 20. A removable cap 22 allows the user to unload warm melt water and to reload the refrigeration delivery system 10 with pieces of ice 12. When the refrigeration system 10 is in use, cold melt water, at a temperature of 0° C. (32° F.) is free to circulate by natural convection into the lower horizontal portion 18.

A grate or grill 24 in the prior art invention of FIGS. 1 and 2 provides an airspace 26 between the cold lower portion 18 and the objects of food and/or drink (not shown) situated above the grate, thereby providing uniform chilling of the food and drink being stored above. A straw 28 allows access to fresh, chilled drinking water 14 that is maintained out of contact with icy melt water of the sort typically found in the bottoms of food storage/chillers in which ice and water are flow freely among the various articles of food and drink being stored.

Referring to FIG. 3, there is shown in oblique view one embodiment of the improved portable refrigeration delivery system 50 according to the present invention. The delivery system 50 has an L shape container or body 54 comprising a hollow vertical tower portion 66 and a hollow, horizontal, flat lower portion 58. A snap-off/snap-off lid 52, having a lift tab 53, covers an access portal (not visible beneath the lid 52) in the top of the body 54 through which to charge the refrigeration system with ice and/or water. If desired, the lid 52 might also include a hinge (not shown) connecting it to the main body 54 of the refrigeration system 50. Molded plastic is the preferred material for the main body 54 and its constituent parts as described further hereinbelow.

An array of protrusions 56 are disposed upon the lower hollow horizontal flat portion 58 and extend upward there from to provide a surface upon which food and/or drink(s) (not shown) can be situated such that air can circulate beneath the food and/or drink(s) so as to maintain a uniformity temperature to which the food/drink is exposed.

The improved portable refrigeration delivery system 50 further incorporates a pump system 60 having a hand-driven plunger portion 62 and a spout portion 64. The spout portion 64 is long enough to protrude beyond the back edge (opposite from the front edge which intersects the horizontal flat portion 58) of the top of the vertical portion 66 of the main body 54 which enables the spout portion to swivel or rotate. The pump and spout assembly or system 60 allows removal of water from the refrigeration system 50 without the inconvenience of the straw 28 disclosed in the prior art displayed in FIGS. 1 and 2. In other words, the pump system 60 makes it possible for the user of the invention to retrieve cold water for drinking or related uses, or alternatively, to remove spent (i.e., warm) water from the refrigeration system 50 without the inconvenience of having to remove the refrigeration system 50 from inside of a thermal ice chest (of the sort that this invention is intended to be used with) followed by inverting the refrigeration invention so as to spill the spent water from it.

It is also within the terms of the invention for the plunger portion 62 and the spout portion 64 to each be extensible in the vertical direction so as to allow clearance with respect to the top of an ice chest (not shown). Moreover, it is also within the terms of the invention that the pump system 60, including the spout portion 64 and the plunger portion 62, can be collectively rotatable in relation to the vertical tower portion 66 of the main body 54 of the refrigeration system 50.

FIG. 4 shows, in partial cutaway side view, of a second embodiment of a portable refrigeration delivery system 80 in accordance with the present invention. The refrigeration delivery system 80 has an L shape main body comprising a hollow vertical tower portion 97 and a hollow horizontal flat lower portion 88. The delivery system 80 incorporates a removable flexible straw 82 having a removable cap/cover 84, which is shown in cross sectional view on top of the flexible straw. The flexible straw 82 is slidably mounted, according to the double-headed arrow 81 within a recessed receptacle 83 in a cover lid portion 86. The cover lid portion 86 has a lift tab portion 87 and flexible plastic hinge portion 85 so as to provide easy access to the inside of the present refrigeration system 80 for purposes of adding ice and for removing water in larger amounts than would be convenient by way of the straw 82.

The flexible straw 82 is removable so as to avoid the difficulties that could arise upon trying to insert the straw when pieces of ice 92 might block the pathway of insertion. Details of the removable straw feature are clarified in FIGS. 5 and 6, which show orthogonal cross sectional views of the straw 82, lid 86 and straw cap 84. In FIG. 5, the straw 82 is shown inserted within the recessed receptacle 83 in the lid 86. The straw 82 is slidably inserted and is removable according to the arrow 81 within said receptacle 83, which has a narrowed bottom 83' that has the function of stabilizing the straw within the receptacle and also minimizing the potential for liquid spillage outward through the receptacle, or the falling inward of undesirable debris.

Referring to FIG. 6, wherein the straw is shown removed from the lid 86, the straw cap 84 is shown fitting within the receptacle 83 so as to seal the receptacle against inadvertent spillage from the vertical tower portion and also the falling of debris thereinto. That is, the receptacle 83 is able to accommodate the cap 84. Note that the receptacle's restricted bottom edge 83' serves as a stop to restrict the degree of insertion of the cap 84 so as to provide a separation 91 between the top most portion of the cover lid 86 and the flange portion 84' of the cap 84, thereby ensuring ease of gripping of the cap 84 and removal thereof from the lid 86. The arrangement shown in FIGS. 5 and 6 further allow that the flexible straw can be stored entirely within the refrigeration system 80, as illustrated in FIG. 4.

Referring again to FIG. 4, the lower hollow horizontal flat portion 88 has attached to it, or integral with it, an array comprising a plurality of protrusions 90 that extend upward from the horizontal flat portion and are intended to provide a circulatory airspace between the refrigeration system 80 and any stored food/drink (not shown) situated thereupon, for the purpose of maintaining uniform temperature of the materials being refrigerated. Ice chips 92, which are initially loaded into the refrigeration system undergo melting, thus resulting in the accumulation of water 94 having a top surface 94'.

It is within the terms of the present invention for the portable refrigeration delivery system 80 shown in FIG. 4 to be large or small in overall dimension such that a small version could be deployed inside a standard lunch box type food container while the large version would be suitable for use within a large picnic size ice chest. In either size format, the present refrigeration invention 80 would thereby provide to the user the benefits of chilled food that is not soggy with meltwater from ice and a ready source of cool water or, if desired, ice-cooled drinking fluids stored in liquid form along with ice chips inside of the refrigeration system. For example, soft drinks, with ice, could be stored inside of the internal space 95.

The inventor realizes that an ideal way of charging the ice refrigerant into the refrigeration delivery systems 50 and 80 would be to cast a block of ice to fit inside a vertical hollow tower portion 66 of the first embodiment, shown in FIG. 3, or in the corresponding hollow vertical tower portion 97 of the embodiment 80 shown in FIG. 4. A volume of cracked ice in water is an equally practical way of charging the system.

The refrigeration delivery system 50, shown in FIG. 3 and comprising a covering lid 52 over a fill port (not visible beneath the cap 52) and the pump portion 60 could be combined with the embodiment 80 shown in cross sectional view in FIG. 4, so as to be a third embodiment having both the removable straw feature 82 and the pump system 60.

The two embodiments 50 and 80 of the present refrigeration system according to the present invention are capable of maintaining a food temperature of slightly above the freezing point of water for considerable periods, depending on such things as the initial temperatures and amounts of comestibles being stored. Tests of working models of this invention in its large 4-liter (1-gallon) forms show that the embodiments described hereinabove can provide substantial cooling (about 500 BTU over a 3 hour period, or 167 BTU/hr) from an initial room-temperature load of canned water (6 liters) and keep said load maintained a temperature near 40° F. over as much as 24 hours. In a comparison test with a thermoelectric refrigeration system designed for the same food-storage purposes, the latter provided about 300 BTU of refrigeration over a period of almost 14 hours, or about 22 Btu/hr. This is a capacity ratio of nearly 8 to 1 in favor of the present invention, which requires no electric power and which may be replenished for over 24 hour periods with ice available in many stores along the highway at reasonable costs. The inventor regards the commercially available thermoelectric refrigeration system to be essentially a "toy" or insufficient in comparison with the capacity of the present invention. For a traveling family, for example, the 12 volt DC automotive power which can run the thermoelectric system is available reliably only while the engine is running. To use it overnight would require purchasing a 110 volt AC adapter, and carrying the box and contents to where the 110 v power was available. In addition to handling far higher loads, the refrigeration system according to the present invention can also extend its use quite far through a second day, by which time, a traveling family, for example, might have had many opportunities to replace the needed ice.

The inventor anticipates also that his refrigeration systems 50, 80 could be manufactured from such plastics as the general class of polyolefins (e.g., polyethylene, polypropylene) or reinforced ABS, with the single large charging port (shown covered by the cap 52 in FIG. 3, or the cap 86 IN FIG. 4) having the lid 52 and 86 respectively of the snap-on type, with or without hinge portions. The large charging port also allows for easy access to the inside of the refrigeration system in the two embodiments shown so that it can be flushed out or sterilized by methods adequate for RV water tanks, such as periodic flushing with such solutions as one or two teaspoonfuls of Clorox per gallon of potable water, followed by 'sweetening' with increasingly dilute food-grade vinegar solutions prior to resumption of use.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. An improved portable refrigeration delivery system, comprising:
    a main body formed of a hollow vertical tower portion and a hollow lower horizontal flat portion adapted to contain a liquid refrigerant, the lower horizontal flat portion includes an array of protrusions integral therewith and extending upward therefrom to form a surface adapted to situate materials being refrigerated directly above the lower horizontal flat portion adapted to contain a liquid refrigerant such that air can circulate between the flat portion containing a liquid refrigerant and the situate materials for the purpose of maintaining a uniform temperature of the materials being refrigerated;
    an access portal having a snap-on lid disposed through the top of the vertical tower portion; and
    a hand actuated pump disposed through the top of the vertical tower portion comprising,
    a plunger portion extending into the vertical tower portion, and
    a spout portion.

2. The portable refrigeration delivery system of claim 1 wherein the spout portion is sufficiently long to protrude beyond the back edge of the top of the vertical tower portion.

3. The portable refrigeration delivery system of claim 2 wherein the spout portion can be swivelled.

4. The portable refrigeration delivery system of claim 1 wherein the hand actuated pump can be collectively rotatable in relation to the hollow vertical tower portion of the main body.

5. The portable refrigeration delivery system of claim 1 wherein the snap-on lid of the access portal is hinged to the main body of the main body.

6. An improved portable refrigeration delivery system, comprising:
    a main body formed of a hollow vertical tower portion and a hollow lower horizontal flat portion adapted to contain a liquid refrigerant, the lower horizontal flat portion includes an array of protrusions integral therewith and extending upward therefrom to form a surface adapted to situate materials being refrigerated directly above the lower horizontal flat portion adapted to contain a liquid refrigerant such that air can circulate between the flat portion containing a liquid refrigerant and the situate materials for the purpose of maintaining a uniform temperature of the materials being refrigerated;
    an access portal having a snap-on lid with a lift tab disposed in the top of the vertical tower portion; and
    a receptacle disposed within the snap-on lid to accommodate a straw.

7. The portable refrigeration delivery system of claim 6 wherein the straw is removable from the receptacle within the snap-on lid.

8. The portable refrigeration delivery system of claim 7 wherein the straw that is removable from the receptacle within the snap-on lid is flexible.

9. The portable refrigeration delivery system of claim 7 wherein the straw that is removable from the receptacle disposed in the snap-on lid has a cap.

10. The portable refrigeration delivery system of claim 9 wherein the cap of the straw fits within and seals the receptacle within the snap-on lid when the straw is removed therefrom.

11. The portable refrigeration delivery system of claim 10 wherein the receptacle within the snap-on lid has a stop that limits the insertion of the cap within the receptacle.

12. An improved portable refrigeration delivery system, comprising:
    a main body formed of a hollow vertical tower portion and a hollow lower horizontal flat portion adapted to contain a liquid refrigerant, the lower horizontal flat portion includes an array of protrusions integral therewith and extending upward therefrom to form a surface adapted to situate materials being refrigerated directly above the lower horizontal flat portion adapted to contain a liquid refrigerant such that air can circulate between the flat portion containing a liquid refrigerant and the situate materials for the purpose of maintaining a uniform temperature of the materials being refrigerated;
    an access portal having a snap-on lid with a lift tab disposed upon the top of the vertical tower portion; and
    a hand actuated pump comprising,
    a plunger portion extending through the top of the vertical tower portion, and
    a spout portion, and
    a receptacle disposed within the snap-on lid to accommodate a straw.

13. The portable refrigeration delivery system of claim 12 wherein the spout portion is sufficiently long to protrude beyond a back edge of the top of the vertical tower portion.

14. The portable refrigeration delivery system of claim 12 wherein the straw is flexible and removable.

15. The portable refrigeration delivery system of claim 12 wherein the straw that is removable from the receptacle disposed in the snap-on lid has a cap.

16. The portable refrigeration delivery system of claim 15 wherein the cap of the straw fits within and seals the receptacle within the snap-on lid when the straw is removed therefrom.

* * * * *